(12) United States Patent
Orubor

(10) Patent No.: US 8,925,142 B2
(45) Date of Patent: Jan. 6, 2015

(54) APPARATUS FOR CLEANING WASTE FROM A SURFACE

(76) Inventor: Lawrence Orubor, Calgary (CA)

( * ) Notice: Subject to any disclaimer, the term of this patent is extended or adjusted under 35 U.S.C. 154(b) by 220 days.

(21) Appl. No.: 13/444,031

(22) Filed: Apr. 11, 2012

(65) Prior Publication Data

US 2013/0269144 A1 Oct. 17, 2013

(51) Int. Cl.
A47L 7/00 (2006.01)
A47L 9/02 (2006.01)

(52) U.S. Cl.
USPC ............................................. 15/322; 15/344

(58) Field of Classification Search
CPC . A47L 11/34; A47L 11/4044; A47L 11/4088; A47L 11/4083
USPC ...................... 15/320–322, 344, 347, 354, 361
See application file for complete search history.

(56) References Cited

U.S. PATENT DOCUMENTS

| | | | |
|---|---|---|---|
| 3,680,504 A | 8/1972 | Seebald | |
| 4,156,952 A * | 6/1979 | Lynch, Jr. | 15/320 |
| 4,709,442 A * | 12/1987 | Sletten, II | 15/320 |
| 4,957,131 A | 9/1990 | Robinson | |
| 5,970,572 A * | 10/1999 | Thomas | 15/320 |
| 6,077,362 A | 6/2000 | Reed | |
| 7,174,603 B2 * | 2/2007 | Sclafani et al. | 15/320 |
| 7,703,170 B2 | 4/2010 | Orubor | |
| 8,578,552 B2 * | 11/2013 | Orubor | 15/320 |
| 2008/0030032 A1 | 2/2008 | Gill | |
| 2008/0093486 A1 | 4/2008 | Orubor | |
| 2009/0070953 A1 | 3/2009 | Orubor | |

FOREIGN PATENT DOCUMENTS

| | | |
|---|---|---|
| CA | 2689384 | 12/2007 |
| CA | 2628557 | 10/2008 |
| FR | 2630141 | 10/1989 |
| WO | WO-2004/059090 | 7/2004 |
| WO | WO-2004/107947 | 12/2004 |

* cited by examiner

Primary Examiner — Dung V Nguyen
(74) Attorney, Agent, or Firm — Maxey Law Offices, PLLC; Stephen Lewellyn

(57) ABSTRACT

An apparatus for removing waste material from a surface is provided. In an embodiment, the apparatus includes a vacuum suction head and a waste receptacle for storing waste material that are vacuumed through the suction opening head. The waste receptacle has a discharge port through which waste material stored within said waste receptacle may be discharged for emptying said waste receptacle. Chemical solution held in a fluid reservoir is pumped to one or more fluid nozzles to break up material during, before or prior to vacuuming.

10 Claims, 17 Drawing Sheets

APPARATUS FOR CLEANING WASTE FROM A SURFACE

FIELD OF THE INVENTION

The present invention relates generally to waste material removal and collection devices, and more particularly, relating to fluid spraying and vacuum device for the treatment and removal of animal waste material from a surface.

BACKGROUND OF THE INVENTION

Animal waste, particularly raw fecal material from dogs and other household pets are smelly and consist largely of numerous disease causing pathogens that pose potential health risks to pets and humans exposed to them. These disease-causing pathogens found in fecal material also contaminate our soil, water and food grown in their vicinity. It is believed, the enormous volume of uncontrolled animal waste produced each year has significant impact on public health and the environment. Particularly, in the presence of accumulated waste in places such as backyards, public and private play grounds, including off leash parks. The presence of animal waste is considered an eyesore and a nuisance that must be eliminated.

SUMMARY OF THE INVENTION

The preferred embodiments of the present invention addresses this need by providing a compact hand held apparatus for clearing waste from a surface that includes treating the waste material with a treatment solution and vacuuming the waste from the surface into a storage receptacle for later disposal at a suitable location. There has thus been outlined, rather broadly, the more important features of the invention in order that the detailed description thereof that follows may be better understood and in order that the present contribution to the art may be better appreciated.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The following drawings illustrate by way of example and are included to provide further understanding of the invention for the purpose of illustrative discussion of the embodiments of the invention. No attempt is made to show structural details of the embodiments in more detail than is necessary for a fundamental understanding of the invention, the description taken with the drawings making apparent to those skilled in the art how the several forms of the invention may be embodied in practice. Identical reference numerals do not necessarily indicate an identical structure. Rather, the same reference numeral may be used to indicate a similar feature of a feature with similar functionality. In the drawings.

DETAILED DESCRIPTION OF THE INVENTION

In this description, references to "one embodiment" or "an embodiment" mean that the featuring being referred to is included in at least one embodiment of the invention. Moreover, separate references to "one embodiment" in this description do not necessarily refer to the same embodiment. Illustrated embodiments are not mutually exclusive, unless so stated and except as will be readily apparent to those of ordinary skill in the art. Thus, the invention may include any variety of combinations and/or integrations of the embodiments described herein.

Figure 1:
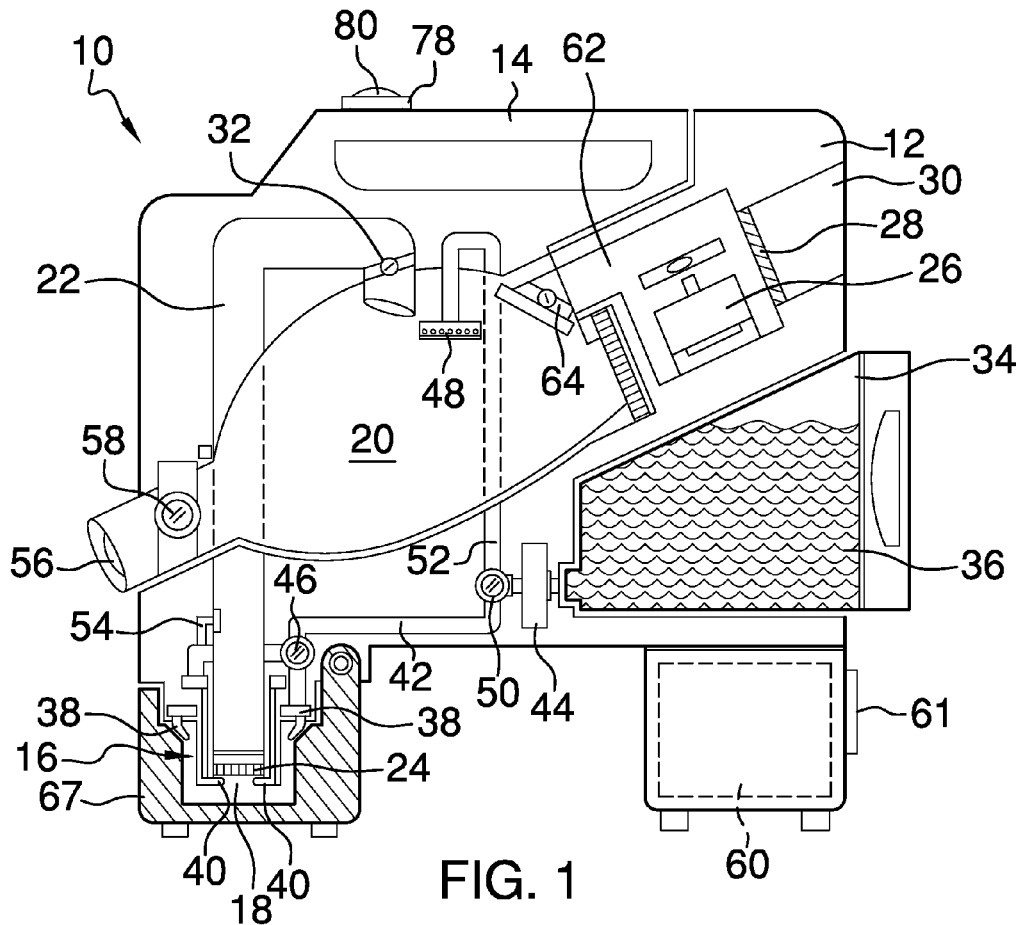
FIG. 1 is a diagrammatic view of an apparatus for clearing waste material from a surface constructed in accordance with the principles of the present invention.

In FIG. 1, there is diagrammatically illustrated a first embodiment of an apparatus for clearing waste from a surface 10 of the present invention. Apparatus 10 provides an operator with a combination of fluid spraying and waste material suction and storage that is particularly useful in clearing a surface, such as a walk way from animal waste or the like. Apparatus 10 is essentially a self-cleaning and self-flushing vacuum cleaning device for the collection, treatment and evacuation of waste material, such as, for an example animal waste that has been deposited on a surface.

Apparatus 10 includes a hand held compact body 12 having a handle 14 disposed at a top end of the body for grasping by an operator. Body 12 includes a vacuum suction head 16 that is disposed at a bottom end of the body and generally opposite from the handle 14. The vacuum suction head 16 has an opening 18 that is connected to a vacuum collection and storage receptacle 20 via vacuum passage 22. A protective grille 24 may be positioned across the opening 18 to prevent large debris from entering vacuum passage 22 that could result in clogging thereof. The receptacle 20 is carried by the body and may be integrally formed therewith, or alternatively, the receptacle may be removably attached to the body to facilitate cleaning as will be described in further detail below. The body 12 houses a vacuum motor 26. Body 12 is configured such that operation of the vacuum motor 26 creates a vacuum in the receptacle 20 through passage 62 drawing air and material through the vacuum opening 18 of the vacuum suction head 16 and into the receptacle. The air is then discharged through an odor-absorbing filter 28 that prevents the discharge of malodors from the device during operation. Filter 28 may also be a HEPA-type filter. The odor-absorbing filter 28 is disposed across vacuum motor air exit 30 and is received by the body 12 in a cooperating manner that does not require any tools for the removal and replacement of the filter. Further, a valve 64 may be disposed across passage 62 and operable to permit the flow of air across the valve and prevent the flow of liquid fluid, thereby preventing fluid, namely waste material, within the vacuum receptacle from being discharged through passage 62.

A vacuum passage valve 32 may be disposed across the vacuum passage 22 and is operated to permit the vacuuming of material into the receptacle 20 and to prevent the reverse flow of material from the receptacle through the vacuum passage. Vacuum passage valve 32 may be a manually operated valve, an electrically operated valve or a manually operated valve integrated with a control switch. As will be described in further detail below a power supply is provided to provide electrical power to the vacuum passage valve 32 in instances where the valve is electrically operated. As also will be described in further detail below, in an alternative embodiment, the body 12 and the vacuum motor 26 may be configured such that operation of the vacuum motor results in air being discharged through vacuum opening 18 of the vacuum section head 16.

Apparatus 10 may further include a fluid reservoir 34 for holding a quantity of waste treatment solution 36 to be dispensed through operation of the device to treat waste material during vacuuming, prior to vacuuming or in some embodiments during discharge of the waste material. The fluid reservoir 34 is carried by the body 12 and may be integrally formed therewith, or alternatively, the fluid reservoir may be removably attached to the body for replacement or for refilling with treatment solution.

The fluid reservoir 34 is fluidically connected to spray nozzles 38 and spray nozzles 40 via fluid passage 42. Spray nozzles 38 are disposed to spray a stream of fluid against the exterior surface of the vacuum head 16. Spray nozzles 40 are disposed to spray a stream of fluid across the vacuum opening 18. A pump 44 is operatively connected to fluid reservoir 34 and fluid passage 42 and is operated to pump treatment solution 36 from the fluid reservoir through fluid passage 42 for discharge through spray nozzles 38 and spray nozzles 40. Pump 44 may be a manually operated pump, or alternatively, an electrically operated pump. In embodiments, a spray nozzle selector valve 46 may be fluidically connected to fluid passage 42, spray nozzles 38 and spray nozzles 40. Spray nozzle selector valve 46 is operable to selectively permit the pumping of treatment solution 36 through either spray nozzles 38 or spray nozzles 40, or simultaneously through spray nozzles 38 and spray nozzles 40. Spray nozzle selector valve 46 may be a manually operated valve or an electrically operated valve.

In embodiments, a vacuum receptacle spray head 48 may be provided for the discharge of treatment solution within the vacuum receptacle 20 for treating the waste material therein and/or for cleaning the interior of the vacuum receptacle. The vacuum receptacle spray head 48 is disposed within the interior of the vacuum receptacle 20 and may be a rotating spray head that is caused to rotate through the discharge of fluid therefrom. In said embodiments, a discharge selector valve 50 is fluidically connected to fluid passage 42 and spray head fluid passage 52. The discharge selector valve 50 is operated to selectively permit the pumping of fluid from the fluid reservoir 34 through either fluid passage 42 or spray head fluid passage 52. The discharge selector valve 50 may be a manually operated valve or an electrically operated valve.

In an embodiment, the apparatus 10 may include a vacuum passage spray nozzle 54 disposed and configured to spray treatment solution into the vacuum passage 22 at a position between the suction head 16 and the collection receptacle 20 to further subject or treat material flowing through the vacuum passage. Vacuum passage spray nozzle 54 is fluidically connected along with spray nozzles 40.

In an embodiment, the vacuum collection and storage receptacle 20 may include a discharge port 56 that is configured to permit the discharge of the contents of the receptacle 20. A discharge valve 58 is disposed across the discharge port 56 and is selectively operated to open and close the discharge port. Discharge valve 58 may be an electrically operated valve. Discharge valve 58 may be a manually operated valve, an electrically operated valve or a manually operated valve integrated with a control switch.

Figure 2:
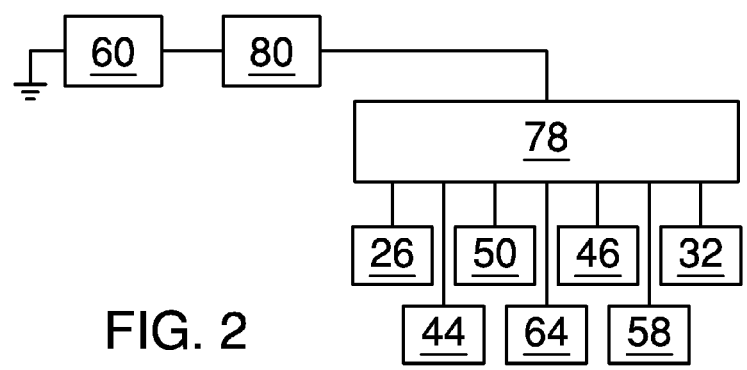
FIG. 2 is an exemplarily block diagram of an electrical schematic of the apparatus of FIG. 1.

Apparatus 10 includes a power supply 60 carried by the body 12 that may be removed to permit replacement or recharging. Power supply 60 provides electrical power to the various electrically operated components of the apparatus 10. A block diagram of an exemplary electrical schematic of the apparatus 10 is illustrated in FIG. 2. An electric connection coupling 61 may be provided to permit the connection of the power supply with a battery recharger. Alternatively, the apparatus 10 could be connected to line power via a cord connected to coupling 61 and an electrical outlet.

In embodiments, the apparatus 10 may include a suction head cover/washbasin 67 that serves a dual purpose of providing protection to the suction head 16 when disposed over the suction head, and providing a wash basin for the cleaning of the suction head. As seen in FIG. 1, the suction head cover 67 is disposed over the suction head 16. The suction head cover 67 may be pivotally attached to the body 12, thereby permitting the pivoting of the suction head cover between a first position wherein the suction head 16 is covered and a section position wherein the suction head is uncovered.

Figure 3:
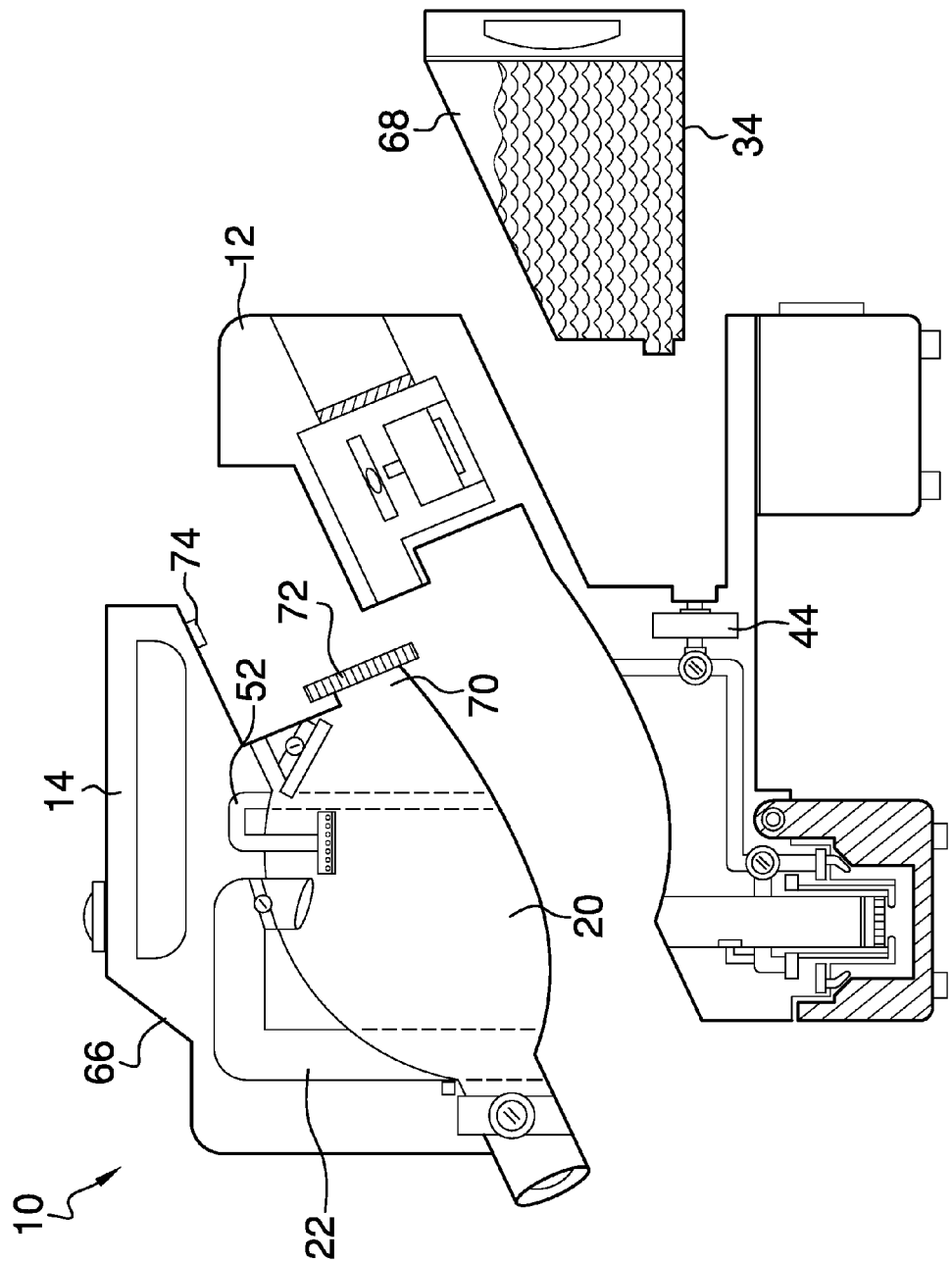
FIG. 3 is a diagrammatic exploded view of an apparatus for clearing waste material from a surface that is constructed in accordance with the principles of the present invention.

FIG. 3 is a diagrammatic illustration of the apparatus 10 with a vacuum receptacle body portion 66 exploded from the body 12 and a reservoir body portion 68 exploded from the body. The vacuum receptacle body portion 66 carries the handle 14, the vacuum receptacle 20 and a portion of the vacuum passage 22 and the spray head fluid passage 52 with the remaining portions thereof being carried by the body 12. A seal disposed about the interface between the half portions of the vacuum passage and the spray head fluid passage. As further illustrated here, the vacuum receptacle 20 may also be fitted with a neck opening 70 that is sealed by removable cover 72. An electrical coupling 74 is provided between the body 12 and the vacuum receptacle body portion 66 as needed to provide electrical connection between electrical components carried by the vacuum receptacle body portion with the electrical components carried by the body. The vacuum receptacle body portion 66 and the body 12 are each configured to be mutually engaged through cooperating structure that permits the removal and attachment of the vacuum receptacle body portion with the body.

The reservoir body portion 68 carries the fluid reservoir 34 and has a handle portion for grasping by an operator. The reservoir body portion 68 and the body 12 are each configured to be mutually engaged through cooperating structure that permits the removal and attachment of the vacuum receptacle body portion with the body. In this regard, the reservoir body portion 68 includes a port that is engaged with a corresponding port on the body 12 when the reservoir body portion is secured to the body portion that establishes a fluid flow from the fluid reservoir 34 with pump 44. The mutually engagable ports are fitted with a valve such that treatment solution 36 is not permitted to flow through the port when the reservoir body portion 68 is disengaged from the body 12. Such a valve configuration may include a membrane seal disposed across the port carried by the reservoir body portion 68 that is pierced by a connecting conduit of the port carried by the body 12. One skilled in the art will readily appreciate other valve configurations are possible.

Figure 4:
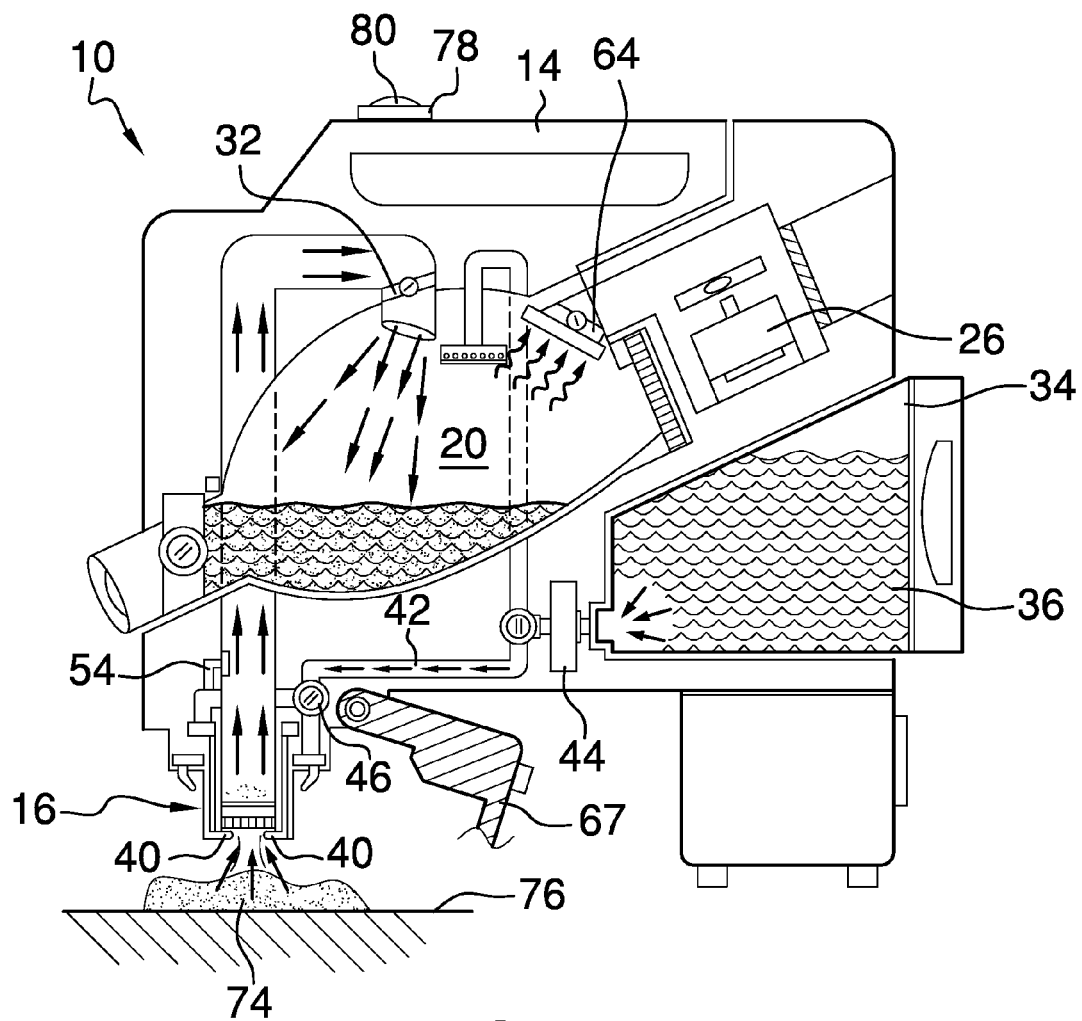
FIG. 4 is a diagrammatic view of the apparatus of FIG. 1 illustrating the apparatus in a mode of operation where waste material is being vacuumed from a surface and is being treated with a treatment solution to liquefy and sanitize the waste material.

FIG. 4 is a diagrammatic illustration of the apparatus 10 operating in one mode of operation wherein the apparatus is operated to vacuum and treat a deposit of waste, such as animal waste 74 from a ground surface, such as a walkway 76. Apparatus 10 is configured for operation by uncovering the suction head 16 by removing or pivoting the suction head cover/wash basin 67 away from the suction head. Operating mode selection switch 78 is selected to permit the operation of selector valve 50 to establish a fluid flow with the pump 44 and fluid passage 42, the operation of the spray nozzle selector valve 46 to establish fluid flow through spray nozzles 40 and optionally vacuum passage spray nozzle 54, the operation of vacuum motor 26, the operation of vacuum passage valve 32 and the operation of valve 64 to permit the flow of air through passage 62 upon the operator pressing the control button 80. An operator positions the suction head 16 in close proximity of the waste deposit 74 and presses the control button 80, which starts the vacuum motor 26, opens the vacuum passage valve 32, starts the pump 44 and operates valves 46, 50 and 64 accordingly. The waste 74 is vacuumed through the vacuum opening 18 of the suction head 16 and through the vacuum passage 22 and deposited into the vacuum receptacle 20. The waste 74 is treated by treatment solution 36 that is discharged through spray nozzles 40 and optionally spray nozzle 54 as the waste is drawn through the vacuum opening 18 and the vacuum passage 22. Treatment solution discharged through spray nozzles 40 and 54 further liquefy the waste material for depositing into the vacuum receptacle 20. Further, the treatment solution sanitizes and deodorizes the waste material. Once the waste is vacuumed sufficiently to the operator's satisfaction, the operator releases the control button. Upon release of the control button 80, valves 32 and 64 are closed and the pump 44 and the vacuum motor 26 are stopped, thereby entraining the collected and treated waste material within the vacuum receptacle for subsequent disposal. In embodiments, a fluid level sensor (not shown) may be included to automatically shutdown the operation of the apparatus 10 when fluid within the vacuum receptacle reaches a predetermined level or volume.

Figure 5:
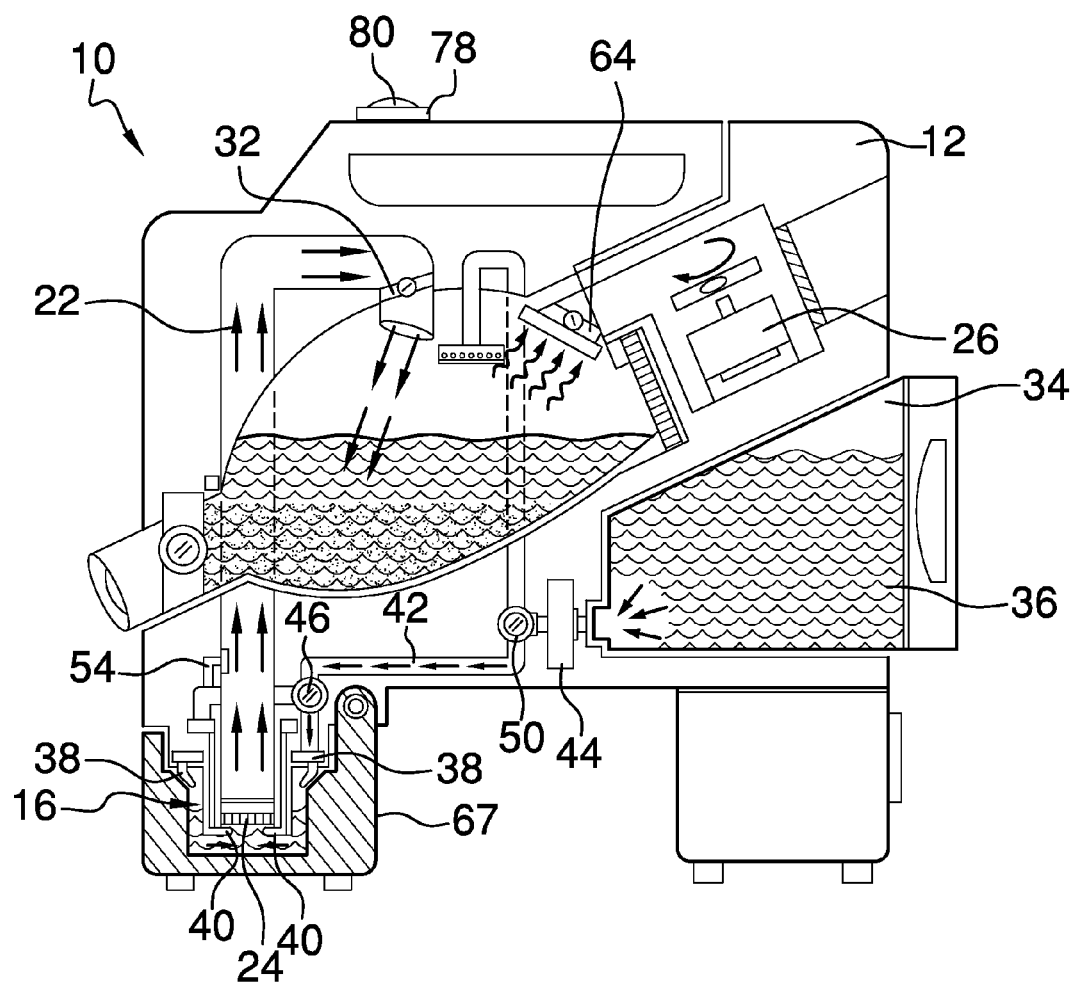
FIG. 5 is a diagrammatic view of the apparatus of FIG. 1 illustrating the apparatus in a mode of operation where the suction head and vacuum passage of the apparatus are being cleaned in a "self-cleaning" mode of operation.

FIG. 5 is a diagrammatic illustration of the apparatus 10 operating in another mode of operation wherein the apparatus is operated in a "self-clean" mode of operation. Here, the suction head 16 is covered by the suction head cover/wash basin 67 and locked in place by a suitable cooperating structure between the suction head cover/wash basin and the body. A seal may be provided between the interface surfaces of the body 12 and the suction head cover/wash basin 67 providing a sealing contact therebetween.

The operating mode selection switch 78 is selected to permit the operation of selector valve 50 to establish a fluid flow with the pump 44 and fluid passage 42, the operation of the spray nozzle selector valve 46 to establish fluid flow through spray nozzles 38, 40 and optionally vacuum passage spray nozzle 54, the operation of vacuum motor 26, the operation of vacuum passage valve 32 and the operation of valve 64 to permit the flow of air through passage 62 upon the operator pressing the control button 80. The operator presses the control button 80, which starts the vacuum motor 26, opens the vacuum passage valve 32, starts the pump 44 and operates valves 46, 50 and 64 accordingly. Treatment solution 36 is discharged through spray nozzles 38 to remove waste from the exterior surface of the suction head 16, through spray nozzles 40 to cleaning the protective grill 24, and optionally through spray nozzle 54 to further clean vacuum passage 22. All treatment solution that is discharged through spray nozzles 38 and 40 is captured and retained within the washbasin 67 where it is vacuumed into the vacuum receptacle for disposal.

In a more sophisticated embodiment, the apparatus 10 may include a processor that is programmed to control the "self-clean" mode of operation according to a programmed self-clean function. Further, a safety switch may be included which ensures the suction head cover/washbasin 67 is securely latched prior to beginning the self-clean operation. Further yet, the apparatus 10 could include various fluid level sensors positioned to determine the fluid level within the washbasin and/or vacuum receptacle 20 to further control the self-clean operation.

Figure 6:
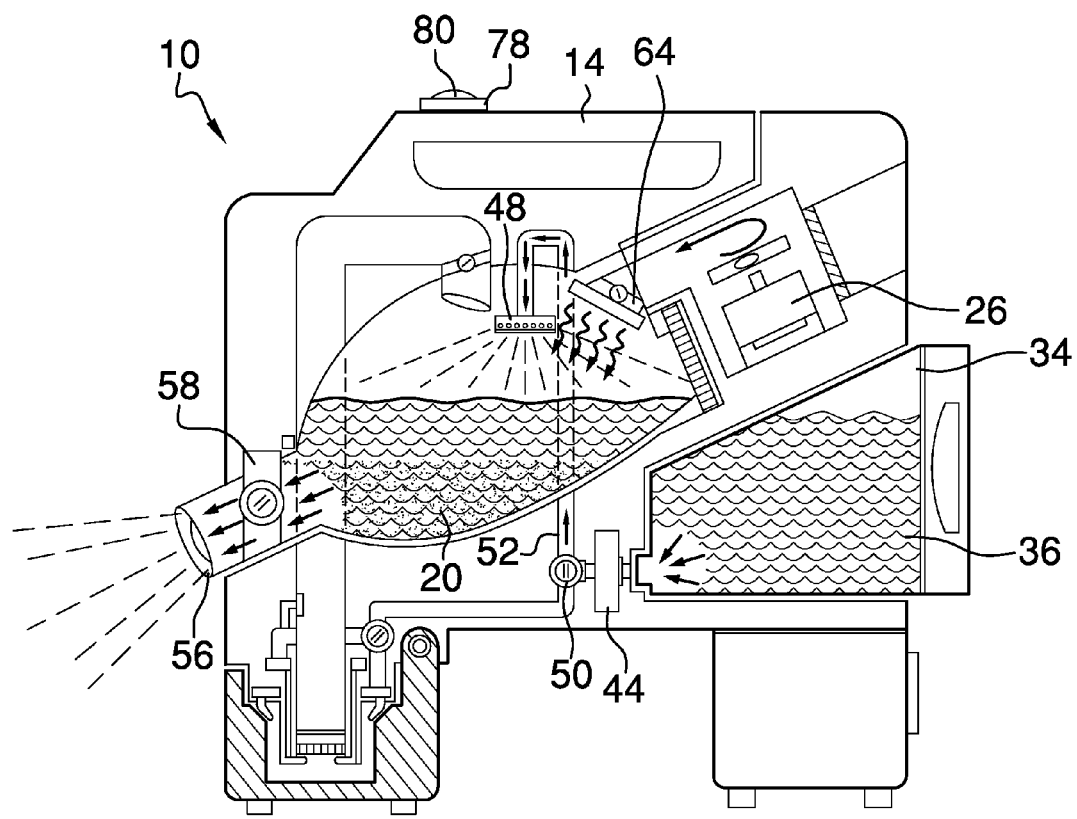
FIG. 6 is a diagrammatic view of the apparatus of FIG. 1 illustrating the apparatus in a mode of operation where the liquefied and treated waste is being emptied from the vacuum storage receptacle of the apparatus in an "evacuation" mode of operation.

FIG. 6 is a diagrammatic illustration of the apparatus 10 operating in another mode of operation wherein the apparatus is operated in an "evacuation" mode of operation wherein the vacuum receptacle 20 is emptied of its contents and is cleaned. The operating mode selection switch 78 is selected to permit the operation of selector valve 50 to establish a fluid flow with the pump 44 and fluid passage 52, the operation of vacuum motor 26 (in a blower configuration), the operation of discharge port valve 58 and the operation of valve 64 to permit the flow of air through passage 62 upon the operator pressing the control button 80. The operator presses the control button 80, which starts the vacuum motor 26, opens the discharge port valve 58, starts the pump 44 and operates valves 50 and 64 accordingly. Open opening of discharge port valve 58, the contents of the vacuum receptacle 20 being to flow outwardly therefrom through the discharge port 56. Treatment solution 36 is discharged through spray 48 and onto the interior surfaces of the vacuum receptacle, thereby cleaning and flushing the interior surfaces. Vacuum motor 26 operating in a blower configuration blows air into the vacuum receptacle, which further aids in the discharge and cleaning of the vacuum receptacle.

In a more sophisticated embodiment, the apparatus 10 may include a processor that is programmed to control the "evacuation" mode of operation according to a programmed self-clean function. The apparatus 10 could include various fluid level sensors positioned to determine the fluid level within the vacuum receptacle 20 to further control the self-clean operation. For example, in a programmed, automatic "evacuation" operation, the discharge port valve 58 may be initially operated prior to operation of any other components to begin the discharge of the contents of the vacuum receptacle. Then upon the level of fluid within the receptacle as determined by one or more fluid sensors, the apparatus may automatically operate valve 50 and pump 44 to spray fluid through spray head 48 to flush the interior surface of the vacuum receptacle 20. The apparatus may further automatically operate the vacuum motor 26 in the blower configuration to further aid in the emptying of the contents of the vacuum receptacle 20. Additionally, after a predetermined time, the apparatus 10 may operate to shut-down the pump 44 to stop the spraying of treatment solution and maintain the operation of the blower motor 26 while maintaining the discharge valve 58 in an open position to dry the interior of the vacuum receptacle. Then, after a predetermined time, the apparatus 10 operates to shut-down the vacuum motor 26 and close the discharge port valve 58, thereby concluding the automated evacuation mode of operation.

Alternatively, as illustrated in FIG. 3, an operator may remove or detach the vacuum receptacle body 66 from body 12 to permit manually emptying and cleaning of the vacuum receptacle 20. In this manner, the vacuum receptacle body 66 is detached from body 12, there by providing access to removable cover 72. The operator may manually operate the discharge port valve 58 and remove cover 72 to empty the contents of the vacuum receptacle 20 as desired. Then with valve 58 and the cover off, the interior of the vacuum receptacle 20 may be flushed using a separate supply of water. It is important to note, the electrical components carried by the vacuum receptacle body 66 are properly encased to permit the submersion of the entire vacuum receptacle body in water to permit cleaning.

Figure 7:
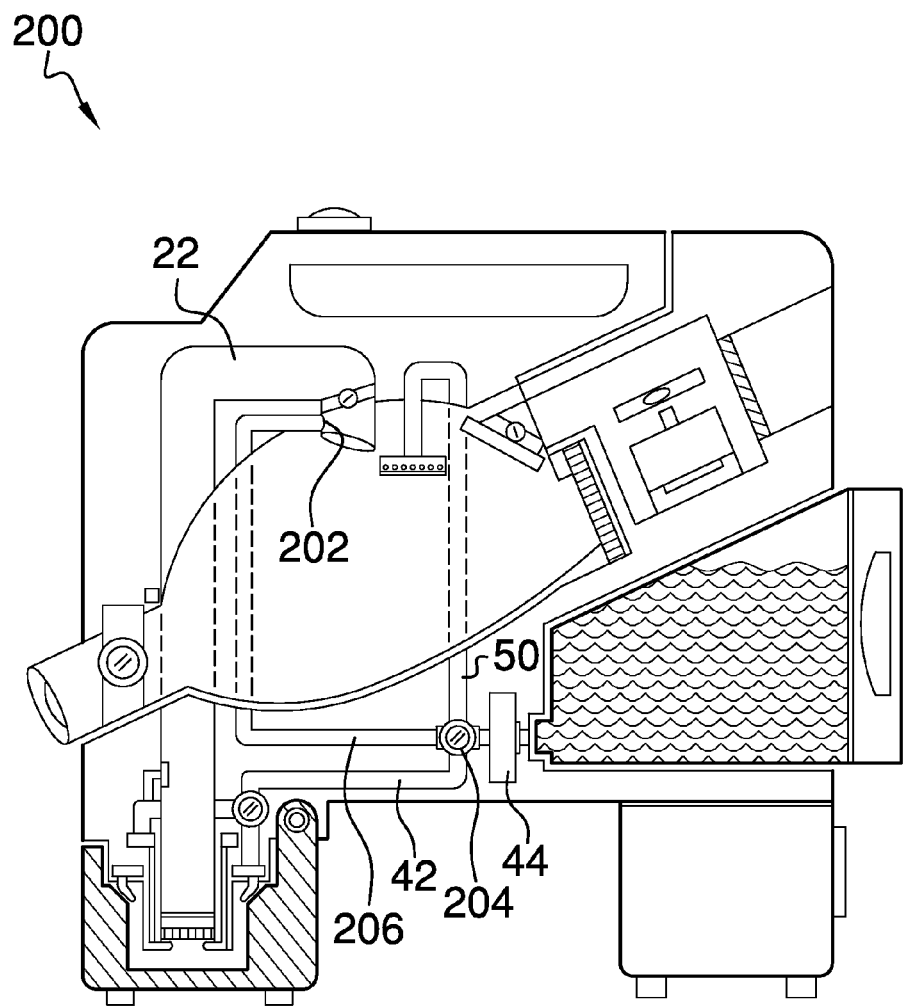
FIG. 7 is a diagrammatic view of an alternative embodiment of the apparatus.

Alternative embodiments of the apparatus 10 are possible. In FIG. 7, there is a diagrammatic illustration of an alternative embodiment 200 of the invention, wherein the same reference numbers refer to similar parts. In this embodiment, a vacuum passage exit spray nozzle 202 is disposed at the exit of the vacuum passage 22 into the vacuum receptacle 20. The vacuum passage exit spray nozzle 202 is fluidically connected to selector valve 204 via fluid passage 206. Selector valve 204 replaces selector valve 50 in the prior embodiments. Selector valve 204 is also fluidically connected to fluid passages 42 and 52, and is operable to selectively fluidically connect the passages to pump 44.

Figure 8:
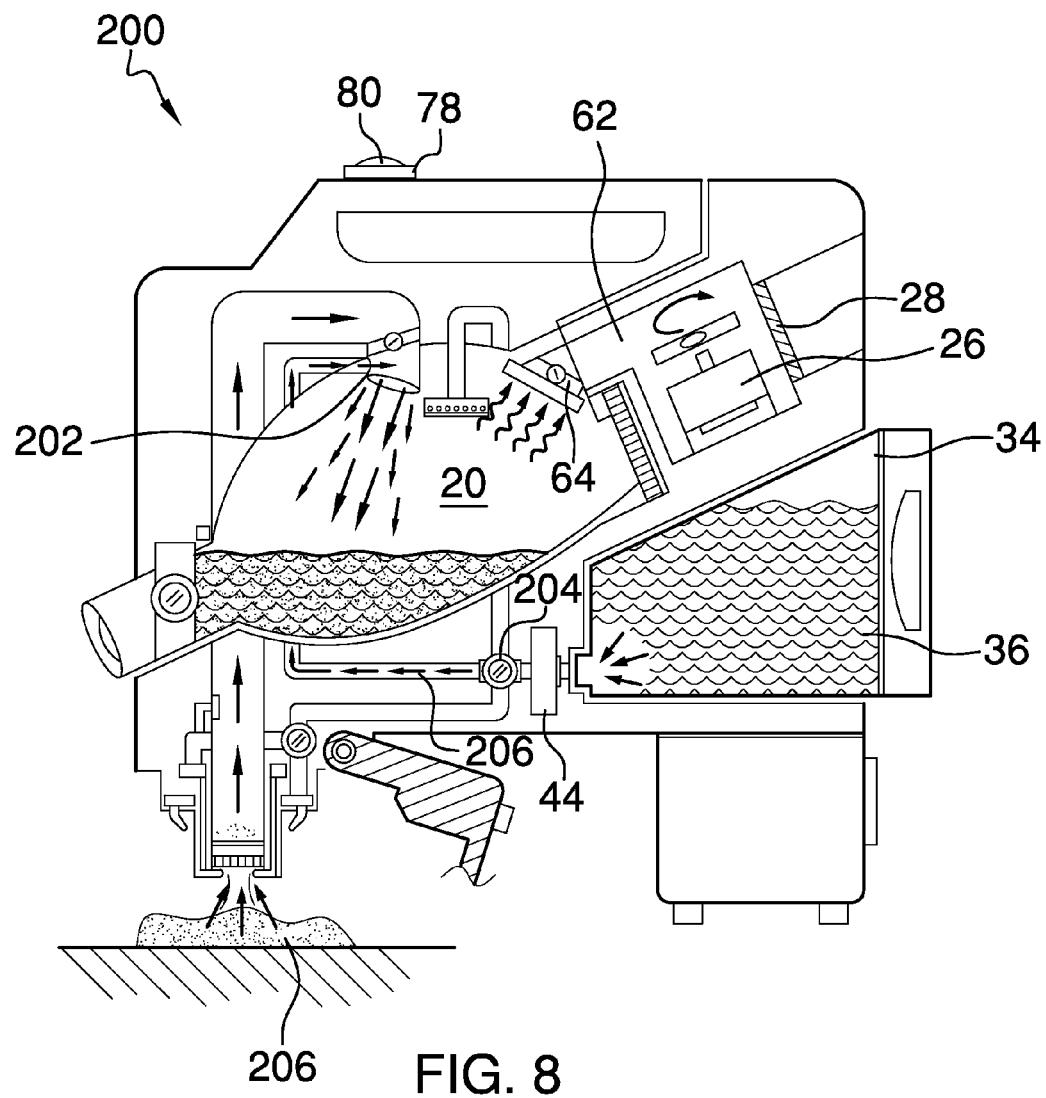
FIG. 8 is a diagrammatic view of the apparatus of FIG. 7 in a vacuum mode of operation.

Apparatus 200 is further illustrated in FIG. 8 in another mode of operation wherein dry waste material 206 is being vacuumed and treated by the apparatus. In this mode of operation, operating mode selection switch 78 is selected to permit the operation of selector valve 204 to establish a fluid flow with the pump 44 and fluid passage 206, the operation of vacuum motor 26, the operation of vacuum passage valve 32 and the operation of valve 64 to permit the flow of air through passage 62 upon the operator pressing the control button 80. In this embodiment, dry waste material is treated with treatment solution 36 prior to being deposited into the vacuum receptacle by being sprayed with treatment solution dispensed from vacuum passage exit spray nozzle 202 prior to exiting the vacuum passage 22. To this end, air born particulates or dust are reduced prior to being deposited into the vacuum receptacle 20, thereby reducing the load on filter 28 and increasing life thereof. As to a further discussion of the manner of usage and operation of apparatus 200, the same should be apparent from the above description. Accordingly, no further discussion relating to the manner of usage and operation will be provided.

Figure 9:
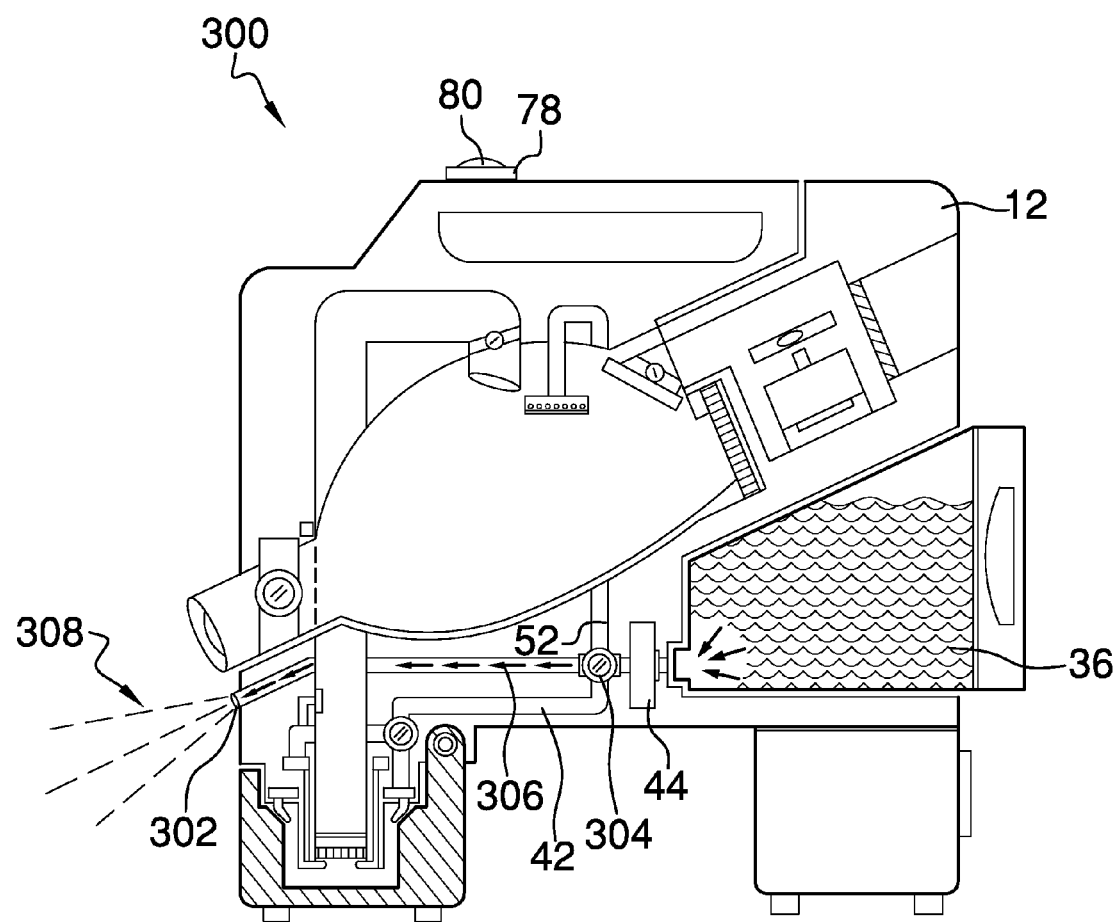
FIG. 9 is a diagrammatic view of an alternative embodiment of the apparatus.

FIG. 9 is a diagrammatic view of an alternative embodiment 300 of the invention, wherein the same reference numbers refer to similar parts. In this embodiment, an auxiliary spray nozzle 302 is provided for flushing, treating or washing a surface, such as a walkway, with treatment solution 36 as depicted here. Auxiliary spray nozzle 302 is disposed on a front end of the body 12 and is fluidically connected to selector valve 304 via fluid passage 306. Selector valve 304 replaces selector valve 50 in the prior embodiments. Operating mode selection switch 78 is selected to permit the operation of selector valve 304 to establish a fluid flow with the pump 44 and fluid passage 306 and the operation of the pump such that activation of control button 80 results in a spray 308 of treatment solution 36 being dispensed from auxiliary spray nozzle 302.

Figure 10:
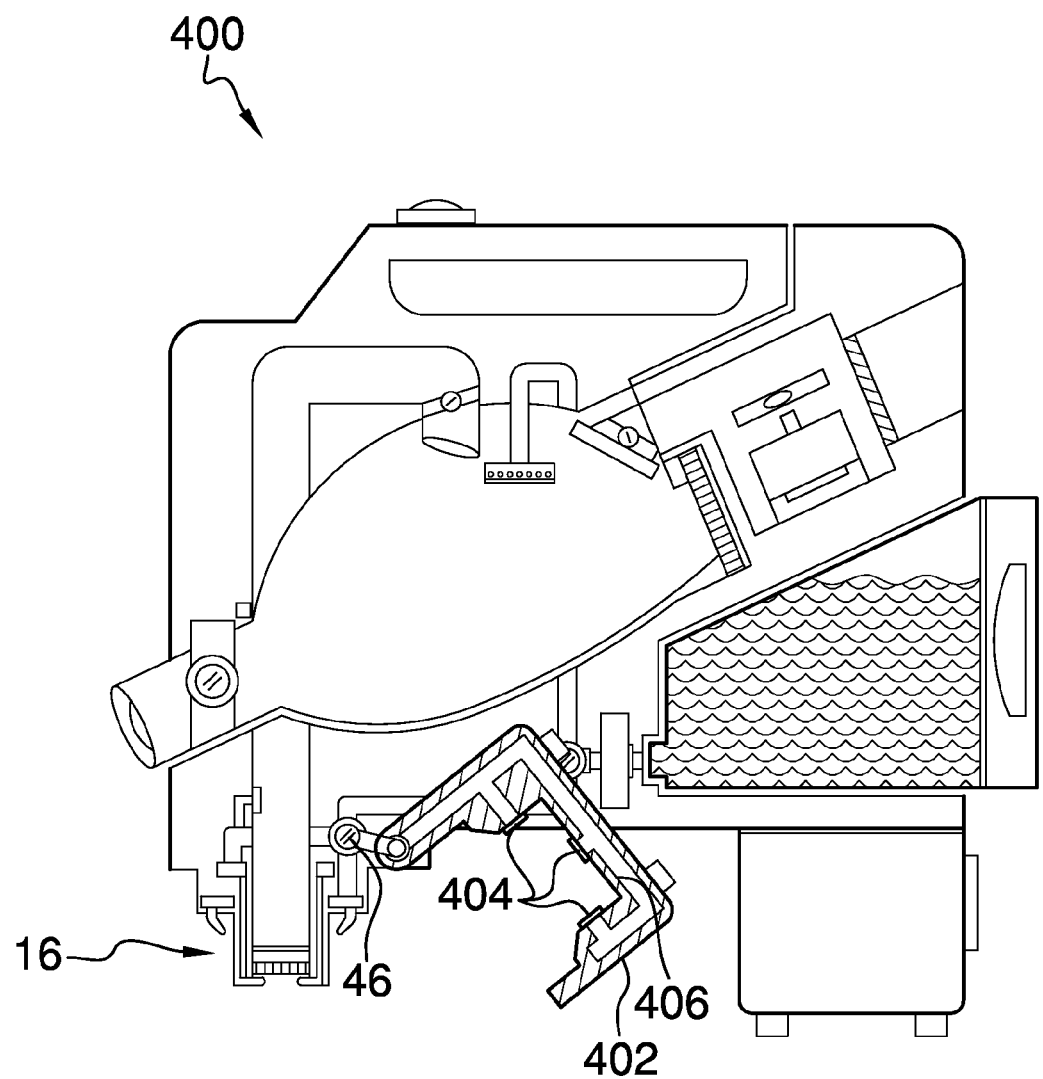
FIG. 10 is a diagrammatic view of yet another alternative embodiment of the apparatus.
Figure 11:
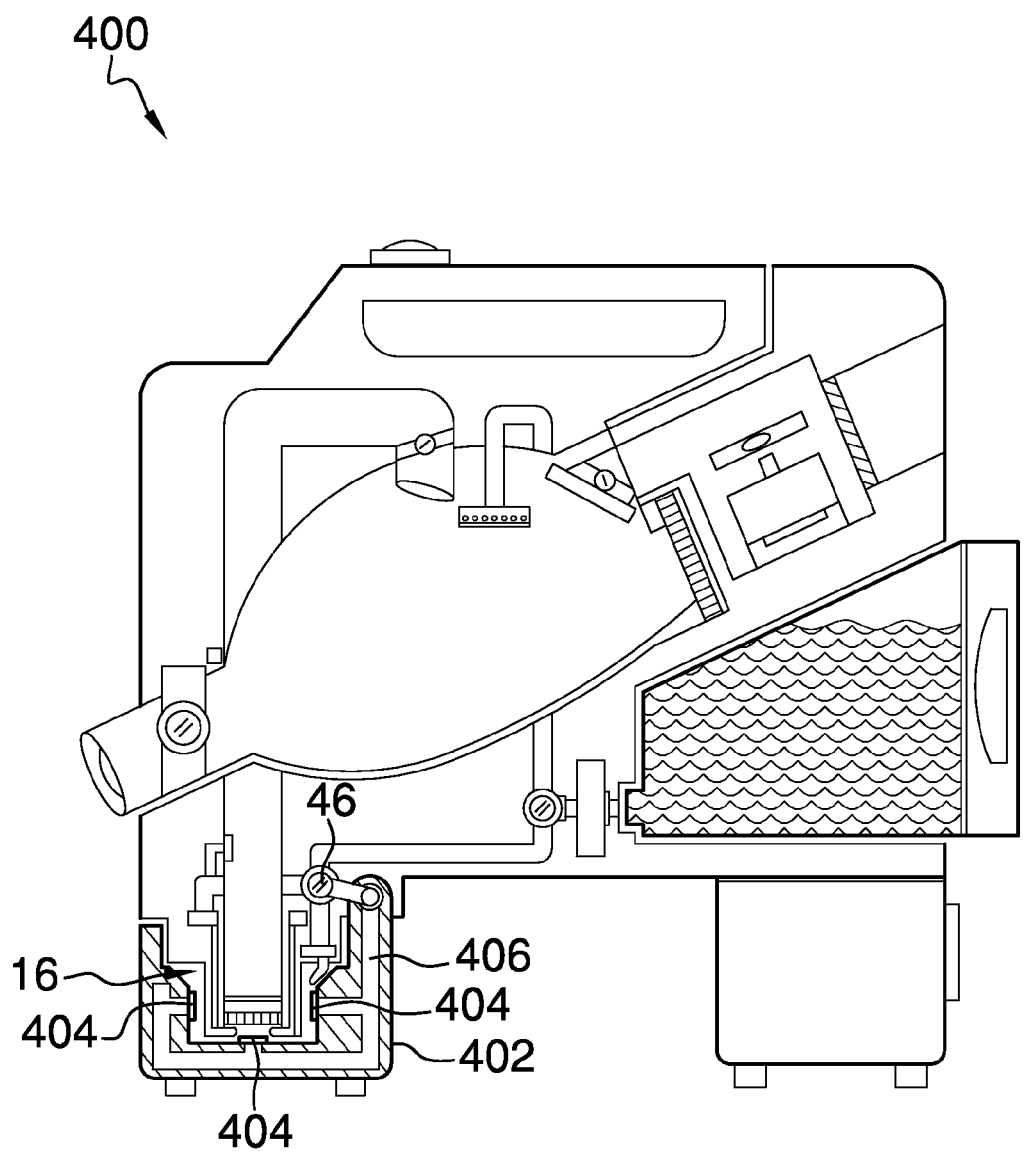
FIG. 11 is a diagrammatic view of the apparatus of FIG. 10 in a second configuration.

FIGS. 10 and 11 are diagrammatic illustrations of yet another alternative embodiment 400 of the invention, wherein the same reference numbers refer to similar parts. In this embodiment, spray nozzles 38 are eliminated and suction head cover/washbasin 67 is replaced with suction head cover/washbasin 402 that includes a plurality of washbasin spray nozzles 404. Spray nozzles are disposed to discharge a spray of fluid against the exterior surface of the suction head 16 during the "self-clean" mode of operation and take place of the operation of spray nozzles 38 in this regard with the other embodiments of the present invention. Spray nozzles 404 are fluidically connected to selector valve 46 via fluid passage 406. Suction head cover/washbasin 402 is shown positioned away from suction head 16 in FIG. 10 and in position covering suction head 16 in FIG. 11. As to a further discussion of the manner of usage and operation of apparatus 400, the same should be apparent from the above description. Accordingly, no further discussion relating to the manner of usage and operation will be provided.

Figure 12:
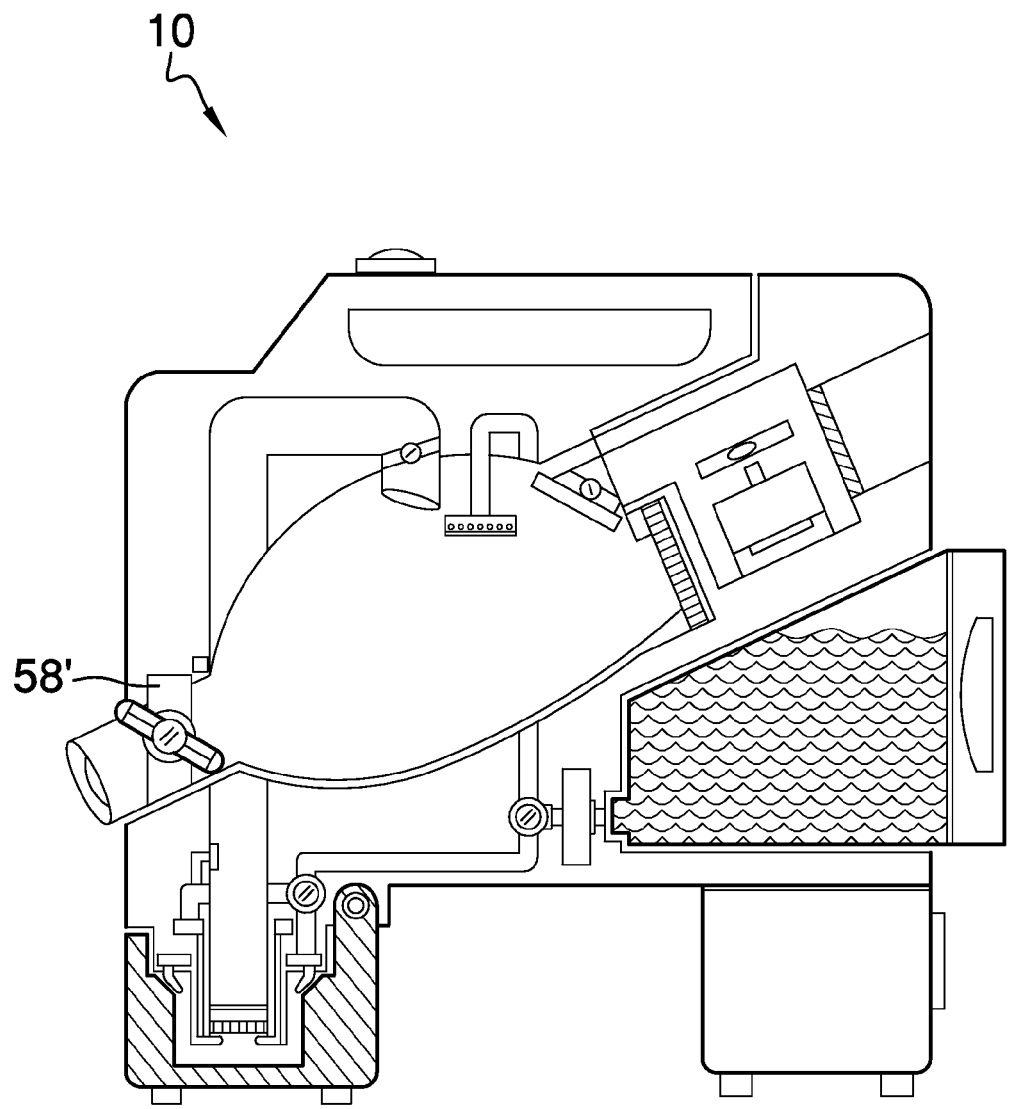
FIG. 12 is a diagrammatic view of yet another alternative embodiment of the apparatus.

FIG. 12 is a diagrammatic illustration of apparatus 10 having an alternative discharge port valve 58' including a manual control lever that may be grasped by an operator to open and close the discharge port valve.

Figure 13:
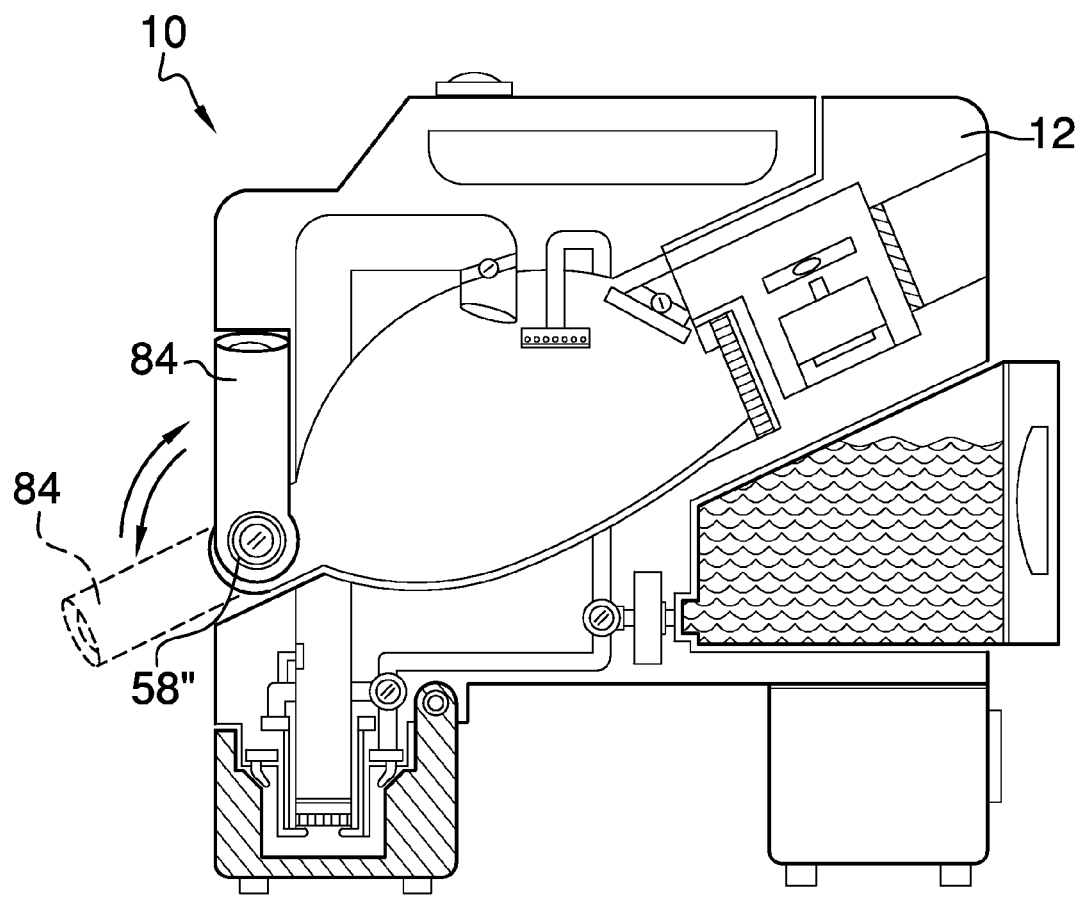
FIG. 13 is a diagrammatic view of yet another alternative embodiment of the apparatus.

FIG. 13 is a diagrammatic illustration of apparatus 10 having an alternative discharge port valve 58" a discharge port tubular extension portion 84. The Extension portion 84 is rotatably with the operation of the discharge port valve 58" between an extended position (shown in broken-line) and a retracted position. In the retracted position, the discharge port valve 58" is closed and the extension portion is nested within the body 12. In the extend position, the discharge port valve 58" is open.

Figure 14:
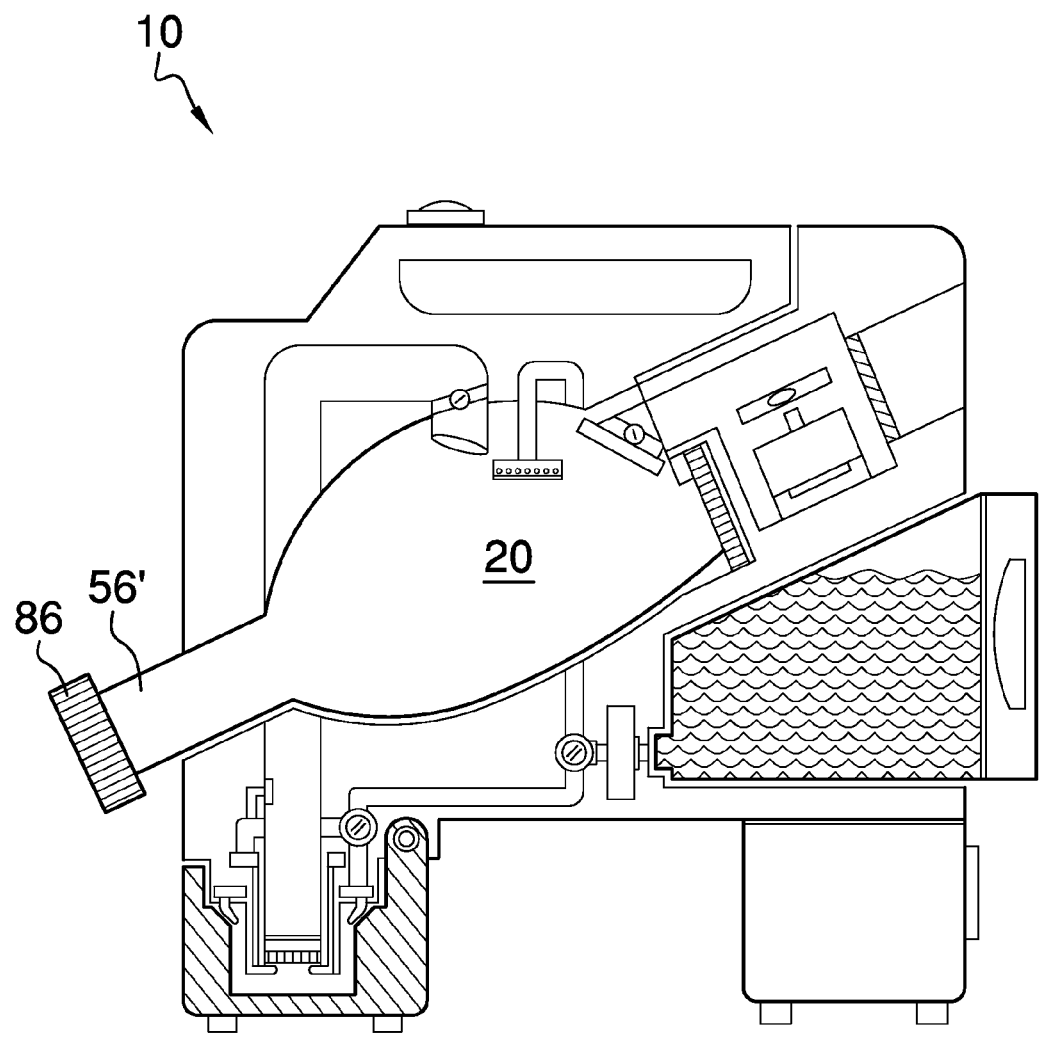
FIG. 14 is a diagrammatic view of yet another alternative embodiment of the apparatus.

FIG. 14 is a diagrammatic illustration of apparatus 10 having an alternative construction, wherein the discharge port valve 58 is eliminated and the discharge port 56' is adapted to receive a removable cover 86, for example by a threaded coupling between the cover and the discharge port. In this manner, an operator may simply remove the cover to permit emptying the contents of the vacuum receptacle 20.

Figure 15:
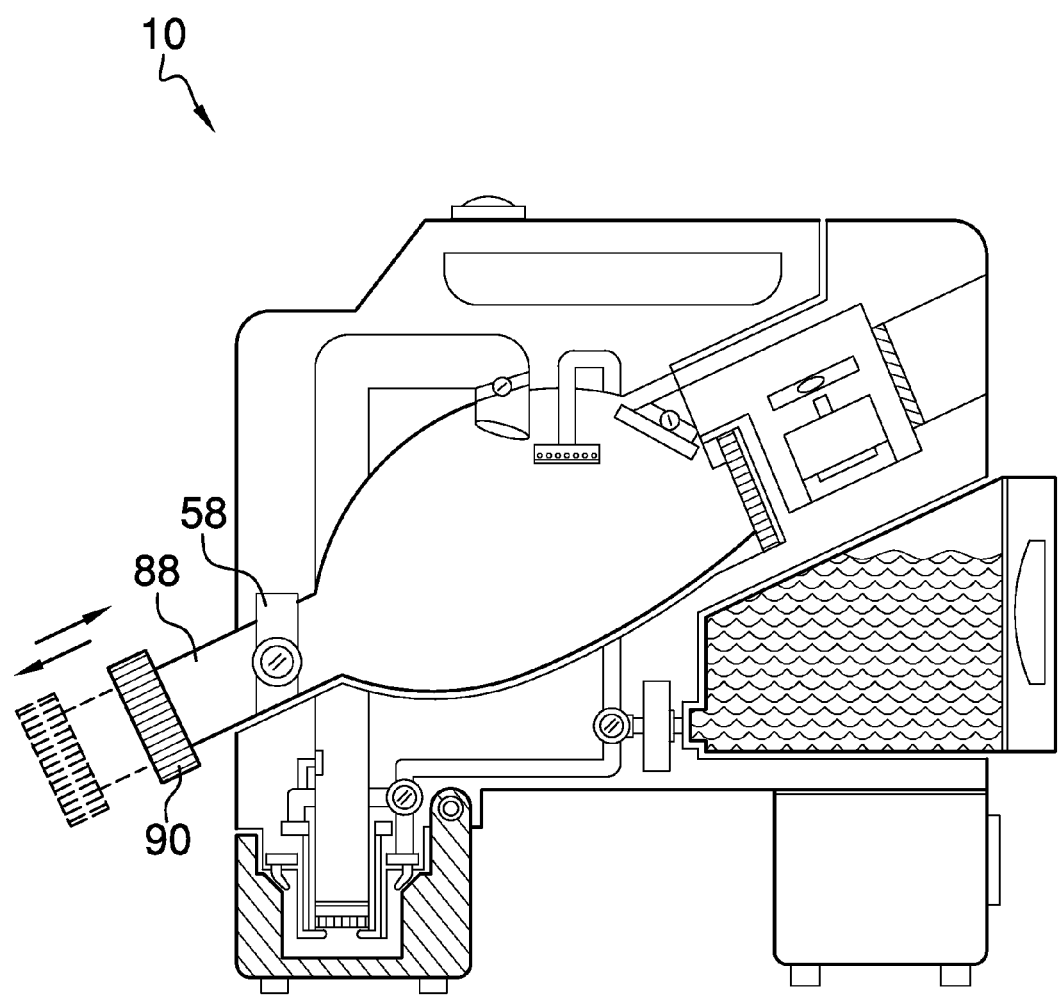
FIG. 15 is a diagrammatic view of yet another alternative embodiment of the apparatus.

FIG. 15 is a diagrammatic illustration of apparatus 10 having an alternative construction, including a discharge port extension 88 extending from the discharge port valve 58. Discharge port extension 88 is extendable in length and includes a removable cover 90 that is, for example, threaded onto the end of the discharge port extension.

Figure 16:
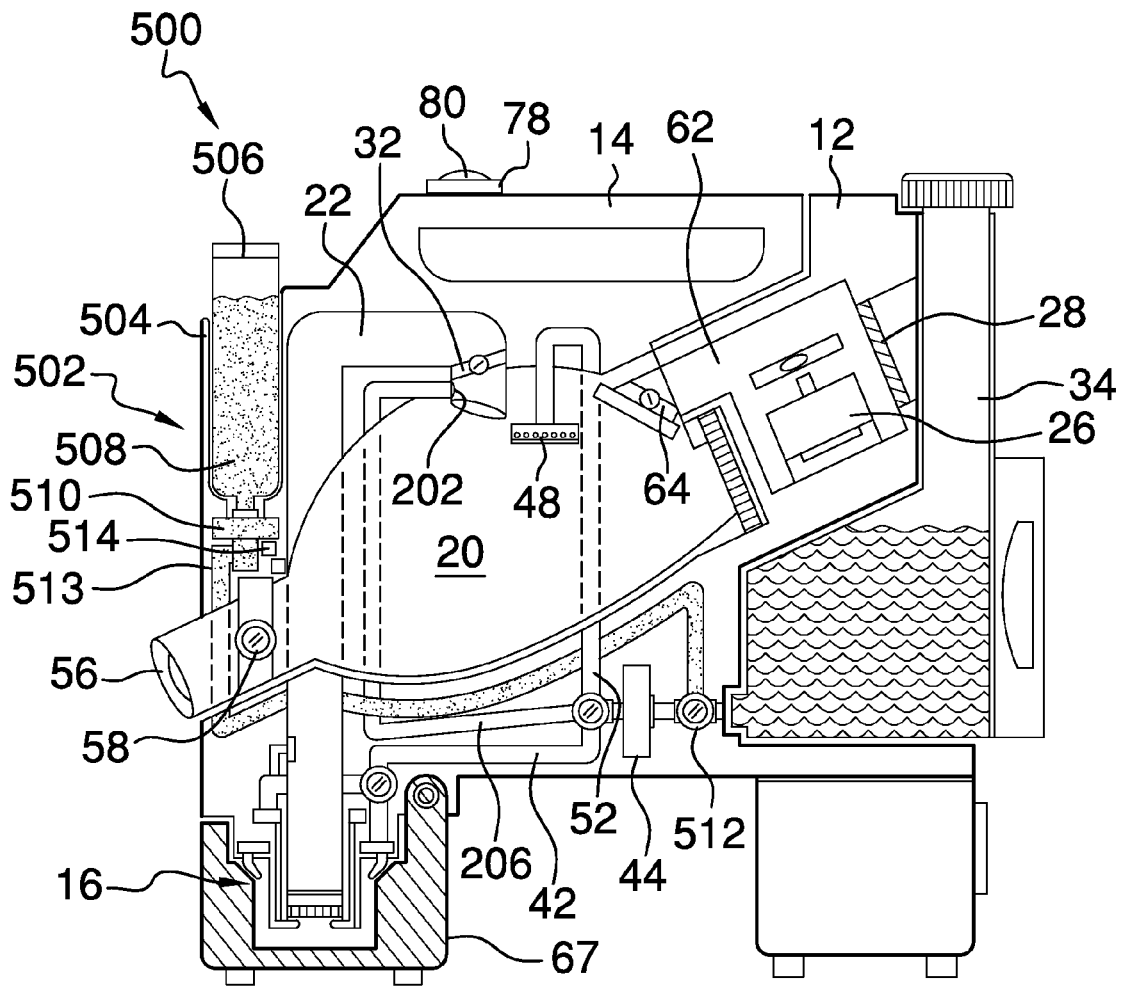
FIG. 16 is a diagrammatic view of yet another alternative embodiment of the apparatus.

FIG. 16 is a diagrammatic illustration of yet another alternative embodiment 500 of the invention, wherein the same reference numbers refer to similar parts. In this embodiment, a chemical dispenser 502 is provided for admixing a concentrated treatment solution with fresh water contained in the fluid reservoir 34. The chemical dispenser 502 includes a cradle 504 disposed on body 12 and configured to removable receive and retain a container 506 containing therein a quantity of chemical concentrate solution 508. Of course, chemical solution 508 need not be a concentrated solution. Further, chemical solution 508 may be a solution having anti-bacterial properties, odor neutralizing properties, etc. A fluid accumulator 510 is fluidically connected to the container 506 to receive therein the chemical solution 508 when the cradle 504 receives the container 506. The container 506 may be fitted with a membrane seal that is pierced by a tube extending from the accumulator 510 to fluidically connect the container and accumulator. Alternatively, a cooperative valve system could be used to fluidically connect the container 506 and the fluid accumulator 510 while preventing spilling of the chemical solution 508 from the container during insertion and removal of the container from the cradle. Essentially, chemical solution 508 within the container 506 flows under the force of gravity into the fluid accumulator 510 when the container is received by the cradle 52, thereby to providing a continuous supply of chemical solution from the container to the accumulator. When the container becomes empty the container is replaced with a full container.

The fluid accumulator 510 is fluidically connected to a mixer valve 512 via passage 513. Mixer valve 512 disposed between pump 44 and the fluid reservoir 34 and operates to mix chemical solution 508 with water contained within the fluid reservoir during the operation of pump 44. Mixer valve 512 may operate to mix chemical solution 508 in proportion to the flow of water through the valve during pumping by pump 44. Mixer valve 512 may also operate such that chemical solution is not mixed with the flow of water during operation of the pump 44.

In an embodiment, the apparatus 500 may include a fluid sensor 514 to detect the presence of chemical solution 508 within the accumulator 510. The apparatus 500 may be configured to operate based upon the fluid sensor output. For example, if the fluid sensor output indicates a condition of no chemical solution within the accumulator, the apparatus may be prevented from operating. In such a condition, container 506 may be empty needs to be replaced with a full container. In this manner, the apparatus is prevented from operating without treatment of the waste material being vacuumed.

Figure 17:
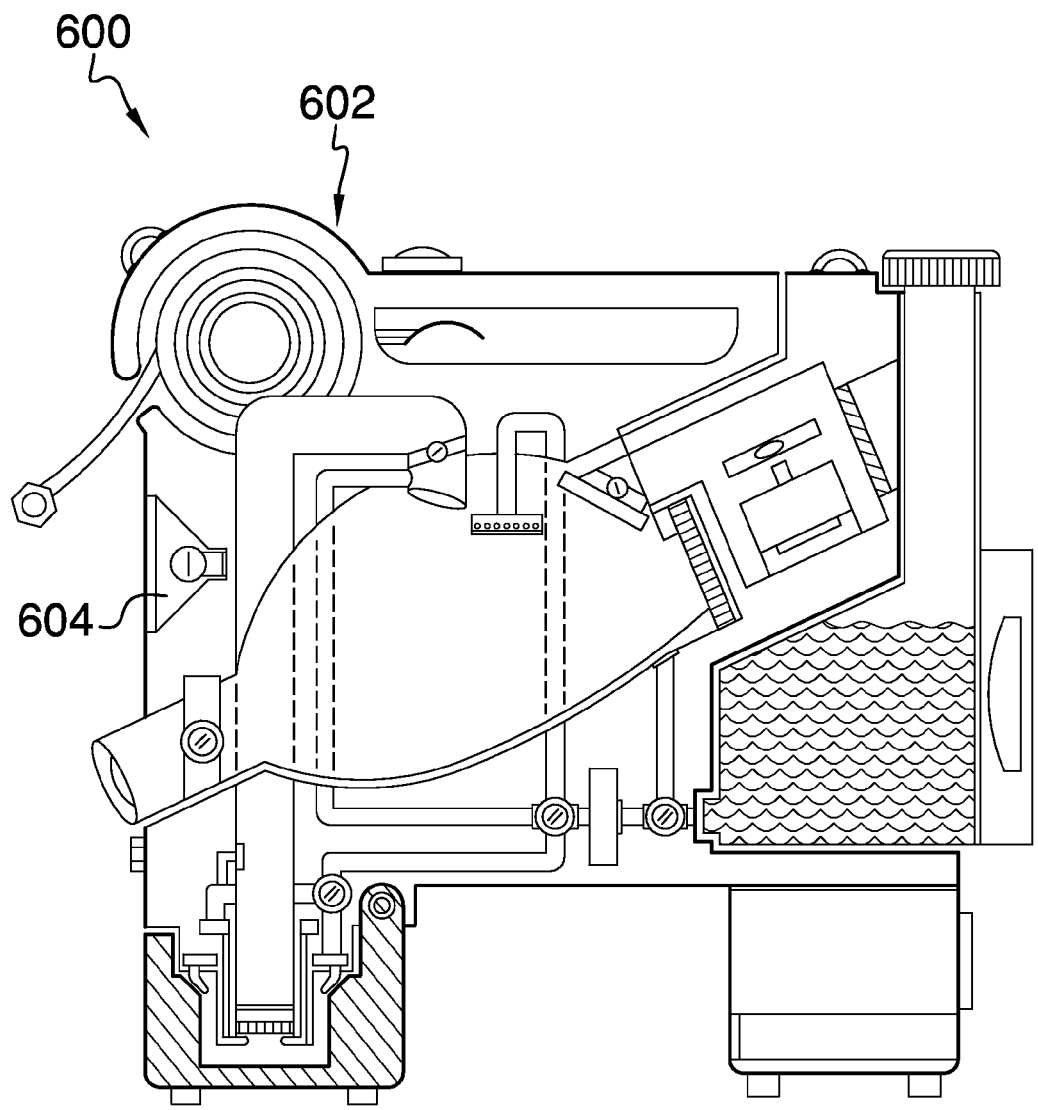
FIG. 17 is a diagrammatic view of yet another alternative embodiment of the apparatus.

FIG. 17 is a diagrammatic illustration of yet another alternative embodiment 600 of the invention, wherein the same reference numbers refer to similar parts. In this embodiment, the apparatus 600 includes a retractable leash 602 and a flashlight 604 housed by body 12. Additionally, while not illustrated, apparatus 600 may include the chemical dispenser configuration of apparatus 500.

Figure 18:
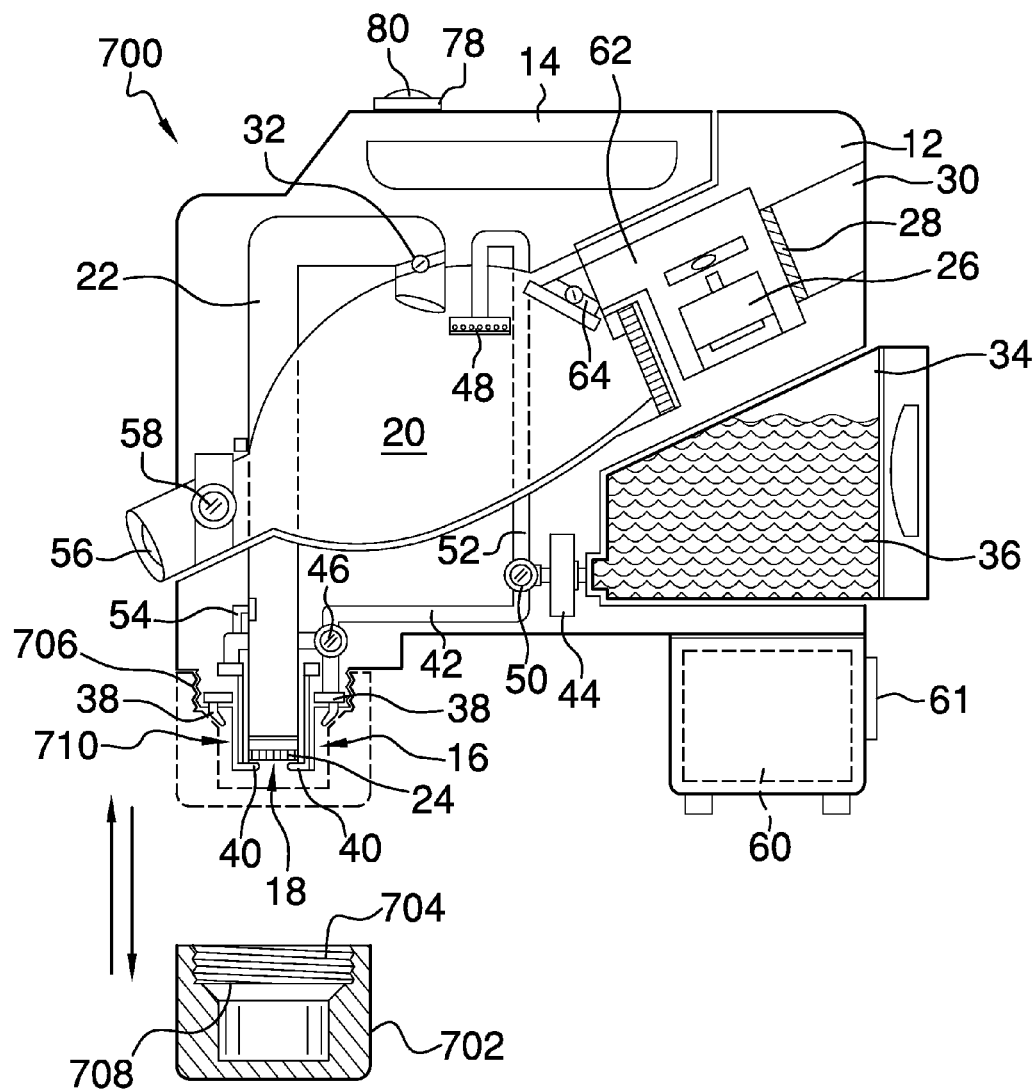
FIG. 18 is a diagrammatic view of yet another alternative embodiment of the apparatus.

FIG. 18 is a diagrammatic illustration of yet another alternative embodiment 700 of the invention, wherein the same reference numbers refer to similar parts. In this embodiment, suction head cover 67 is replaced by suction head cover 702 that is removably attached to the apparatus 700 to receive and cover the suction head 16 and nozzles 38 and 40. Suction head cover 702 may be removably attached by cooperating threads 704, 706. Suction head cover 702 includes a seal 708, which provides a sealing contact between the suction head cover and the apparatus when the cover is attached to the apparatus.

It should be apparent that the suction head cover 702 is removed or detached from the apparatus 700 to expose the suction head 16 and vacuum opening 18 so as to allow operation of the apparatus in the removal and treatment of material as described above. After use, the suction head cover 702 is attached to the apparatus to cover the suction head 16, vacuum opening 18 and nozzles 38 and 40. A water tight seal is provided by seal 708 to prevent leakage from during the self-clean mode of operation described above. Suction head cover 702 is configured such that when attached to the apparatus 700, a space 710 is provided between the cover and the suction head 16 and nozzles 38, 40 to permit the spray washing of the exterior surface of the suction head 16 and also to allow liquid used for washing to be retained and suctioned once washing is completed. In this case, the suction head cover 702 is used as a wash basin for washing the suction head 16 free of contamination after use and for sealing away the suction head from the surroundings to avoid contamination during transportation of the apparatus.

A number of embodiments of the present invention have been described. Nevertheless, it will be understood that various modifications may be made without departing from the spirit and scope of the invention.

What is claimed is:

1. An apparatus for clearing waste from a surface, comprising:
    a vacuum suction head having a suction opening for accepting waste material;
    a waste receptacle for storing waste material that are vacuumed through said suction opening, said waste receptacle is removable from said apparatus, said waste receptacle having a discharge port through which waste material stored within said waste receptacle may be discharged for emptying said waste receptacle, said waste receptacle further having a neck opening opposite of said discharge port;
    a vacuum passage fluidically connecting said suction opening and said waste receptacle;
    a reversible vacuum pump in communication with said waste receptacle for alternately providing a vacuum on said waste receptacle and pressurizing said waste receptacle;
    a vacuum passage valve disposed across said vacuum passage, said vacuum passage valve operable to alternately permit or preclude a flow through said vacuum passage;
    a waste receptacle discharge valve disposed across said discharge port, said waste receptacle discharge valve operable to alternately permit or preclude a flow through said discharge port;
    a fluid reservoir for holding a quantity of liquid;
    a pump fluidically connected to said fluid reservoir and operable to pump liquid therefrom;
    a fluid passage connected at one end to said pump for receiving pumped liquid;
    one or more first spray nozzles fluidically connected to said fluid passage and configured and disposed to spray a fluid from said fluid passage on to an exterior surface of said suction head for cleaning debris therefrom;
    one or more second spray nozzles fluidically connected to said fluid passage and configured and disposed to spray a fluid from said fluid passage at said suction opening;

a spray nozzle selector valve operable to selectively and alternately permit or preclude a flow through said first spray nozzle and concurrently through said one or more second spray nozzles and one or more third spray nozzles;

a spray head fluidically connected to said fluid passage and configured and disposed to spray a fluid from said fluid passage within said waste receptacle for flushing the interior thereof;

a spray head valve operable to alternately permit or preclude a flow through said spray head;

a discharge port spray nozzle fluidically connected to said fluid passage and configured and disposed to spray a fluid from said fluid passage into said discharge port;

a discharge port spray nozzle valve operable to alternately permit or preclude a flow through said discharge port spray nozzle;

a vacuum passage spray nozzle fluidically connected to said fluid passage and configured and disposed to spray fluid from said fluid passage into said vacuum passage at location intermediate said suction head and said waste collection receptacle; and a vacuum passage spray nozzle valve operable to alternately permit or preclude a flow through said vacuum passage spray nozzle.

2. The apparatus of claim 1, further comprising:

a washbasin having a receptacle into which said suction head is positional, said washbasin being pivotally mounted for rotation between positions wherein said suction head is positioned within said washbasin receptacle and where said suction head is not positioned within said washbasin receptacle.

3. The apparatus of claim 2, further comprising:

one or more washbasin spray heads disposed along the interior of said washbasin receptacle that are configured to direct fluid against said suction head when positioned within said washbasin receptacle, said one or more washbasin spray heads being fluidically connected to said fluid passage; and a washbasin valve operable to alternately permit or preclude a flow through said one or more washbasin spray heads.

4. The apparatus of claim 1, wherein said third spray nozzle being connected to said fluid passage and configured to jet fluid from said fluid passage in a direction away from an operator and against material on the surface.

5. The apparatus of claim 1, wherein said fluid reservoir is removable from the apparatus.

6. The apparatus of claim 1, further comprising:

a chemical concentrate container for holding a quantity of chemical concentrate, said chemical concentrate container fluidically connected to said pump;

a mixer valve fluidically connected to said chemical concentrate container and said fluid reservoir, said mixer valve operating to selectively mix a flow of chemical concentrate contained by said chemical concentrate container and a flow of liquid contained by said fluid reservoir.

7. The apparatus of claim 6, wherein said chemical concentrate container is removable from said apparatus.

8. The apparatus of claim 6, wherein said fluid reservoir is removable from the apparatus.

9. The apparatus of claim 1, further comprising:

a lid removably attachable to said apparatus, said lid covering said suction head and suction passage and containing said one or more first spray nozzles and said one or more second spray nozzles entirely within said lid when said lid is attached to said apparatus.

10. The apparatus of claim 9, wherein said lid provides an interior space between said suction head and said lid.

* * * * *